US005777825A

United States Patent [19]
Dorius

[11] Patent Number: 5,777,825
[45] Date of Patent: Jul. 7, 1998

[54] NEGATIVE PRESSURE STEP PAD AIR BEARING DESIGN AND METHOD FOR MAKING THE SAME

[75] Inventor: Lee K. Dorius, San Jose, Calif.

[73] Assignee: International Business Machines Corporation, Armonk, N.Y.

[21] Appl. No.: 706,244

[22] Filed: Sep. 4, 1996

[51] Int. Cl.$^6$ ............................................. G11B 5/60
[52] U.S. Cl. ............................................... 360/103
[58] Field of Search ................................... 360/103

[56] References Cited

U.S. PATENT DOCUMENTS

| | | | |
|---|---|---|---|
| 4,644,641 | 2/1987 | Verdone | 360/103 |
| 4,802,042 | 1/1989 | Strom | 360/103 |
| 5,128,822 | 7/1992 | Chapin et al. | 360/103 |
| 5,345,353 | 9/1994 | Krantz et al. | 360/103 |
| 5,404,256 | 4/1995 | White | 360/103 |
| 5,406,432 | 4/1995 | Murray | 360/103 |
| 5,418,667 | 5/1995 | Best et al. | 360/103 |
| 5,424,888 | 6/1995 | Hendriks et al. | 360/103 |
| 5,438,467 | 8/1995 | Dorius et al. | 360/103 |
| 5,490,025 | 2/1996 | Dorius et al. | 360/103 |
| 5,490,026 | 2/1996 | Dorius et al. | 360/103 |
| 5,499,149 | 3/1996 | Dovek | 360/103 |
| 5,550,693 | 8/1996 | Hendriks et al. | 360/103 |

FOREIGN PATENT DOCUMENTS

| | | |
|---|---|---|
| 3-241577 | 2/1990 | Japan. |
| 4-362582 | 6/1991 | Japan. |
| 0 701 249 A2 | 3/1996 | WIPO. |

OTHER PUBLICATIONS

Exhibit A James W. White, "Negative Pressure Air Bearing for Very Low Flying Heads", Head/Media Technology Review, Nov. 12, 1994.

*Primary Examiner*—Robert S. Tupper
*Attorney, Agent, or Firm*—Merchant, Gould, Smith, Edell, Welter & Schmidt, P.A.

[57] ABSTRACT

An air bearing slider design exhibiting reduced altitude sensitivity and requiring only two etch depths for ease of manufacture. The slider includes a support structure having a leading and trailing step surface disposed thereon. The leading step surface has two side rails joined together at the leading edge and extending toward the trailing edge, forming a negative pressure pocket therebetween. A front pad is formed on the leading step surface and a trailing pad is formed on the trailing step surface. The side rails have a length that is selected for creating a predetermined negative pressure. The trailing and leading step surfaces preferably have a height above the support structure of between 0.5 μm and 5 μm. Preferably, the front and rear pads have a height above the leading and trailing step surfaces respectively that is less than the height of the step surface above the support structures. The side rails may extend substantially to trailing edge. The trailing step surface may include trailing step surfaces adjacent the trailing edge designed to vary the effect of the negative pressure pocket.

32 Claims, 10 Drawing Sheets

| TABLE 2 FLY HEIGHT DROP FROM 0-10,000 Ω | | | | | |
|---|---|---|---|---|---|
| DESIGN | E1, um | E2, um | LOAD, gm | ID DROP, nm | OD DROP, nm |
| POS PRESS | 5 | NA | 3.0 | -8.7 | -15.9 |
| NEG PRESS | 5 | NA | 3.0 | -12.6 | -15.6 |
| BOBSLED | 0.11 | 17 | 3 | -11.6 | -12.7 |
| BOBSLED | 0.11 | 17 | 1.4 | -14.0 | NA |
| NPBS 1A | 0.11 | 5 | 3 | -12.4 | -11.8 |
| NPBS 1B | 0.11 | 1 | 3 | -6.6 | -7.1 |
| NPBS 1C | 0.11 | 1 | 0.5 | -3.8 | -3.3 |

NEGATIVE PRESSURE STEP PAD AIR BEARING DESIGN AND METHOD FOR MAKING THE SAME

BACKGROUND OF THE INVENTION

1. Field of the Invention

This invention relates in general to air bearing sliders, and more particularly, to an air bearing slider design which exhibits reduced altitude sensitivity.

2. Description of Related Art

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

In magnetic recording technology, it is continually desired to improve the areal density at which information can be recorded and reliably read. Because the recording density of a magnetic disk drive is limited by the distance between the transducer and the magnetic media, a goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

One improvement in magnetic disk drive technology involves zone bit recording. Zone bit recording is an advanced media optimization technique where the number of sectors per track is dependent upon the cylinder circumference, e.g., tracks on the outside cylinders have more sectors per track than the inside cylinders, but each sector contains the same number of bytes of data.

Zone bit recording can provide significant performance and capacity improvements in magnetic disk storage files. However, in order to facilitate this technology, it is desirable for the air bearing slider to maintain a constant spacing between the read/write head and the disk across all of the zones, from the inner-diameter (ID) radius to the outer-diameter (OD) radius of the disk. This presents a key technical challenge, since the air velocity created by the rotating disk varies in both magnitude and direction relative to the slider at all radii. The situation is further exacerbated in files with rotary actuators, as the slider skew angle is varied across the ID-OD data band.

Thus, in addition to achieving a small average spacing between the disk and the transducer, it is critical that a slider fly at a relatively constant height despite the large variety of conditions it experiences during the normal operation of a disk drive. If the flying height is not constant, the data transfer between the transducer and the recording medium may be adversely affected. It is also essential that variations in the physical characteristics of the slider, e.g. due to manufacturing tolerances, not substantially alter the flying height of the slider. If this result is not achieved, the slider's nominal fly height must be increased to compensate for variations between sliders.

An example of a parameter that can vary during normal operation of a disk drive is the radial position of a slider with respect to the rotating disk. The flying height of a slider is affected as the actuator arm is moved radially to access different data tracks. This is due to differences in the linear velocity of the disk at differing radii. In effect, the air bearing slider flies at different speeds at differing radii relative to the disk. Because a slider typically flies higher as velocity increases, there is a tendency for sliders to fly higher at the outer diameter of the disk. Disk drives and sliders must be designed to minimize this effect.

The fly height of a slider is also very sensitive to changes in altitude. As the altitude increases, the fly height drops corresponding to the drop in atmospheric pressure. This occurs with both positive pressure and negative pressure air bearing designs used in current products today. Reliability degrades with increases in altitude as the resulting fly height drop causes more head/disk interaction and failures.

Therefore, it can be seen that there is a need for a slider design with reduced altitude sensitivity.

It can also be seen that there is a need for a slider design with reduced altitude sensitivity that does not result in a substantial increase in manufacturing expense.

SUMMARY OF THE INVENTION

To overcome the limitations in the prior art described above, and to overcome other limitations that will become apparent upon reading and understanding the present specification, the present invention discloses an air bearing slider design which exhibits reduced altitude sensitivity.

The present invention solves the above-described problems by providing a slider design with reduced altitude sensitivity that requires only two etch depths for ease of manufacture.

A system in accordance with the principles of the present invention includes a support structure having a leading and trailing step surface disposed thereon. The leading step surface has two side rails joined together at the leading edge, and extending toward the trailing edge, forming a negative pressure pocket therebetween. A front pad is formed on the leading step surface and a trailing pad is formed on the trailing step surface. The side rails have a length that is selected for creating a predetermined negative pressure or fly height.

One aspect of the present invention is that the trailing and leading step surfaces have a height above the support structure of between 0.5 µm and 5 µm microns depending on the file environment and slider size.

Another aspect of the present invention is that the trailing and leading pads on the respective step surfaces have a height less than that of the step surfaces above support structure.

Another aspect of the present invention is that the front pad comprises two front pads, each pad being proximate to the sides of the support structure.

Another aspect of the present invention is that the trailing pad is disposed generally in the center of the trailing step surface at the trailing edge and may be generally equidistant from the sides of the support structure.

Another aspect of the present invention is that the front pad includes an angled leading edge.

Yet another aspect of the present invention is that the side rails extend substantially to trailing edge.

Another aspect of the present invention is that the trailing step surface includes two trailing step surfaces adjacent the trailing edge on each side of the support structure and forming a channel therebetween, wherein the negative pressure pocket formed between the side rails vents through the channel.

Still another aspect of the present invention is that the side rails connect to the two trailing step surfaces.

Another aspect of the present invention is that the side rails terminate forward of the two trailing step surfaces forming two side vents.

Another aspect of the present invention is that the leading pad and trailing pad each further include a generally v-shaped notch disposed at a leading edge thereof.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an air bearing slider which possesses reduced fly height sensitivity due to changes in altitude.

Figure 1:
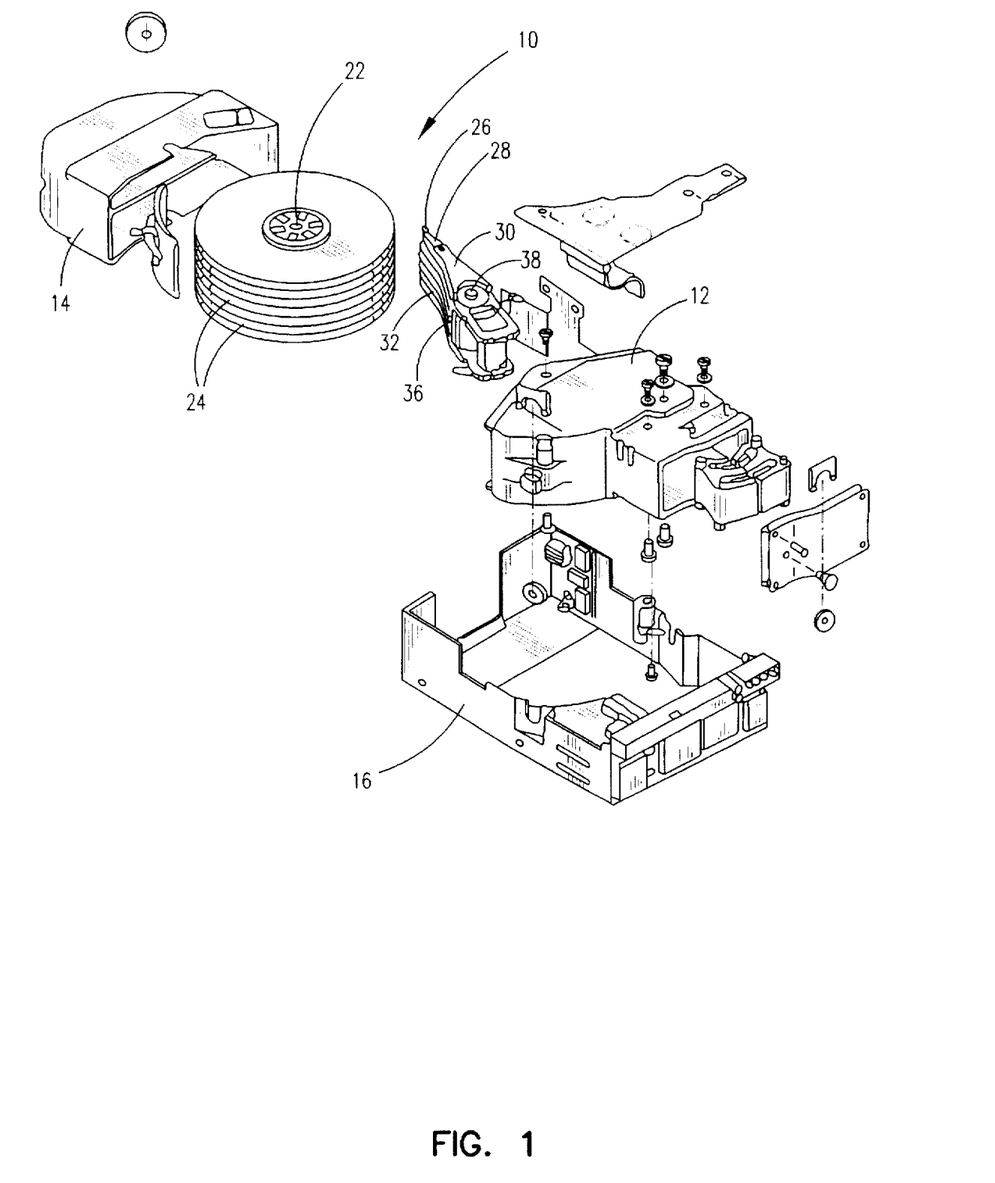
FIG. 1 is an exploded view of a disk drive suitable for practicing the present invention.

FIG. 1 is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor (not shown). Information is written on or read from the disks 124 by heads or magnetic transducers (not shown) which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138. However, those skilled in the art will readily recognize that the invention is not limited to the data storage device described above.

The fly height of air bearing sliders for disk drives is sensitive to altitude reducing file reliability above sea level. The air bearing slider according to the present invention reduces altitude sensitivity. The new design is achieved by taking a step-pad (bobsled) design and adding a negative pressure pocket between the leading and trailing pads. The negative pressure pocket is designed to a specific etch depth which achieves the reduced altitude sensitivity.

Figures 2A, 2B:
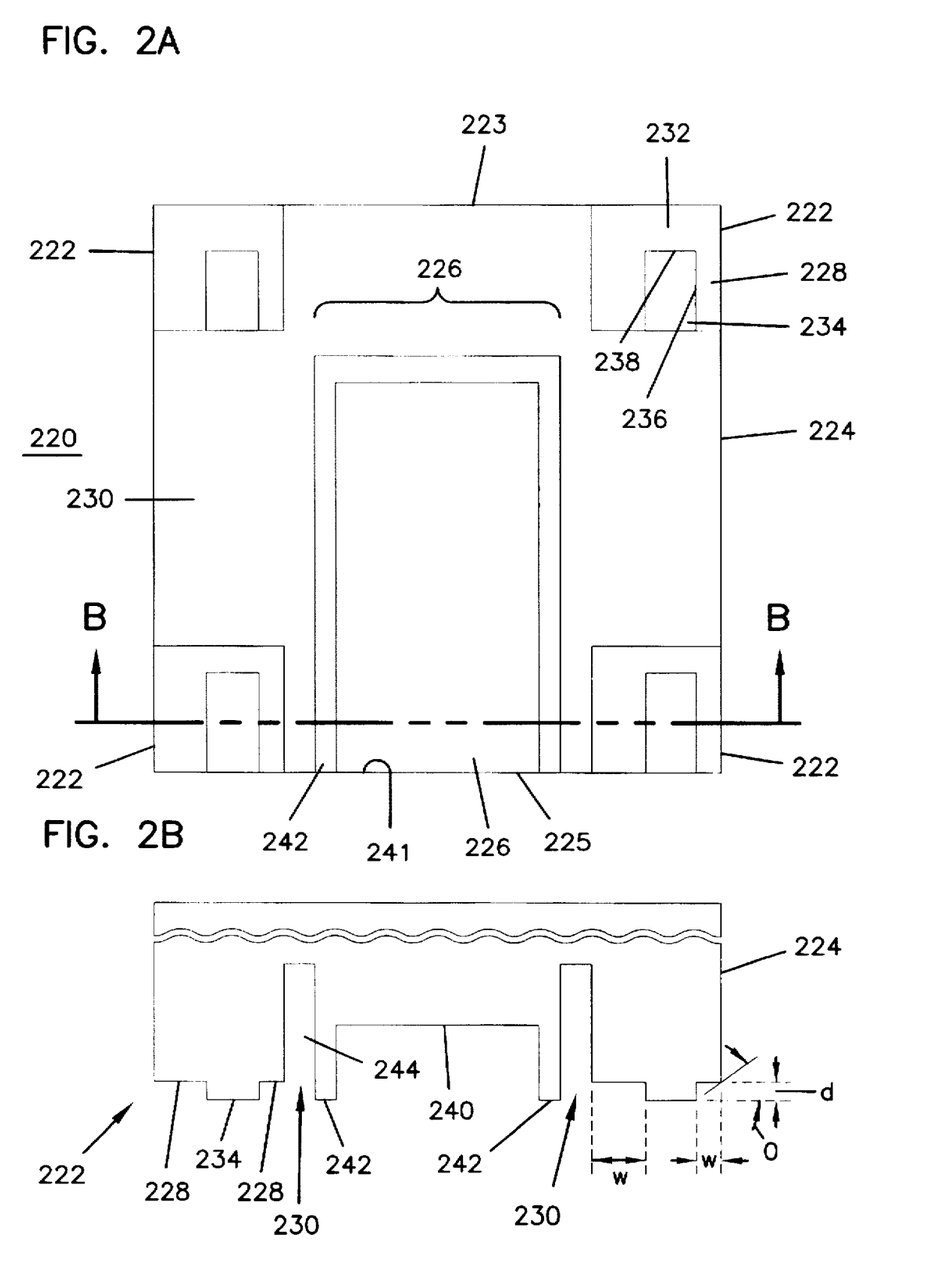
FIGS. 2A–2B illustrate a prior art slider design.

FIGS. 2A–2B illustrate a prior art slider design 200 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, TPC pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas.

However, the design as illustrated in FIGS. 2A–2B requires three etch depths to achieve the desired performance. A critical aspect of this design is a requirement for the three etch steps which makes it more costly to manufacture compared to a design which requires only one or two etch depths.

Figure 3:
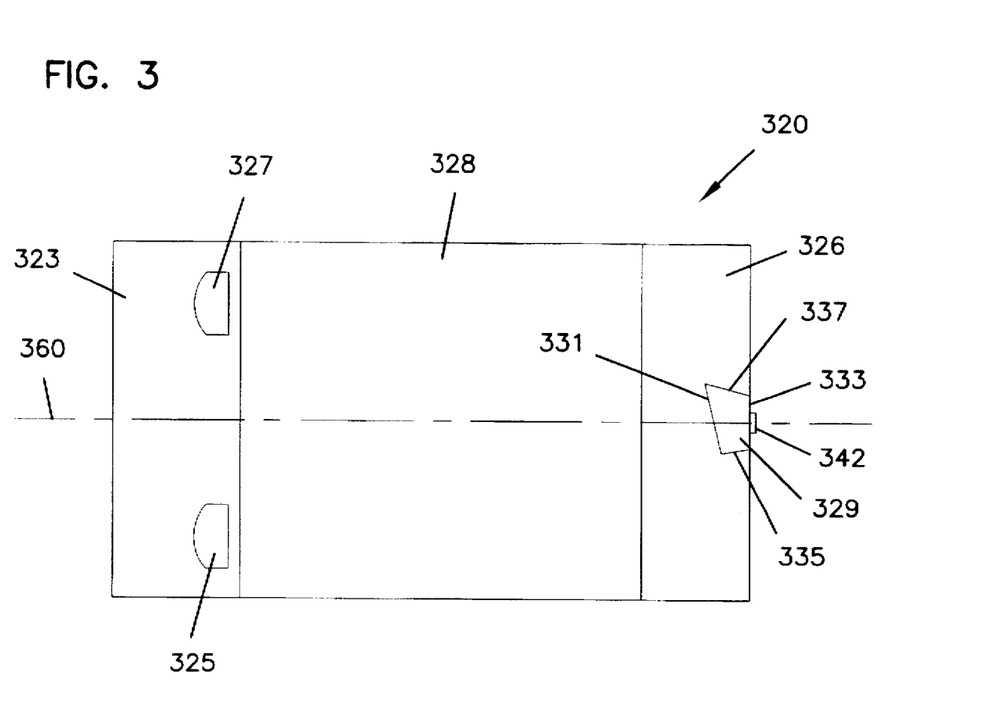
FIG. 3 illustrates a prior art step pad design having only two etch steps.

FIG. 3 illustrates a step pad design (i.e., bobsled) which has only two etch steps 323, 328 in its simplest version. The design illustrated in FIG. 3 is disclosed in U.S. Pat. No. 5,418,667, issued May 23, 1995 to George L. Best et al., entitled "SLIDER WITH TRANSVERSE RIDGE SECTIONS SUPPORTING AIR-BEARING PADS AND DISK DRIVE INCORPORATING THE SLIDER", assigned to the assignee of this application, and is incorporated by reference herein. Leading 325, 327 and trailing 329 pads are formed with a shallow etch depth 323, 326 and are separated by a deep cavity 328 which ensures ambient pressure between them. Although the design illustrated in FIG. 3 achieves a flat fly height profile, the design suffers from poor altitude sensitivity.

Figure 4:
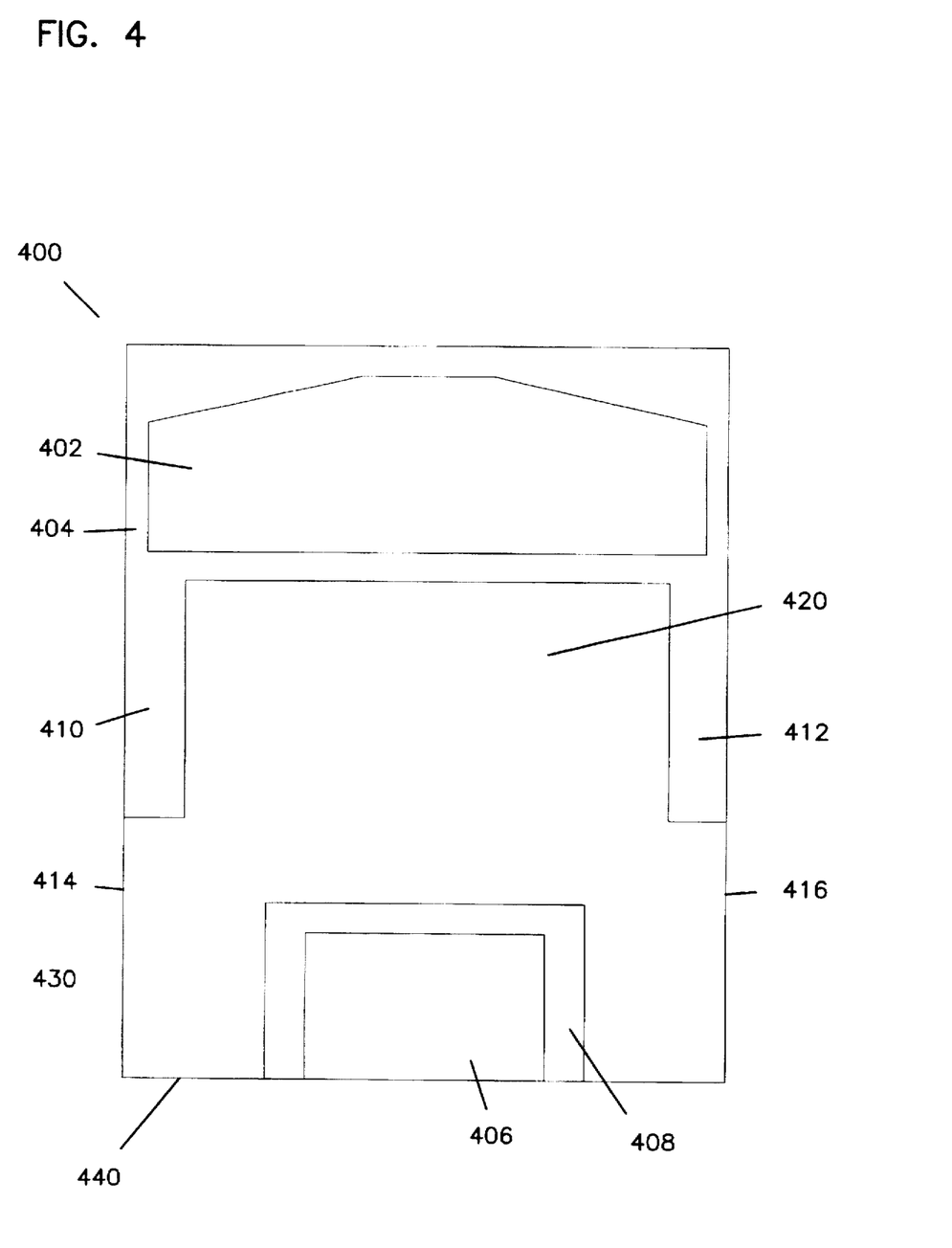
FIG. 4 illustrates a slider design according to the present invention.

FIG. 4 illustrates a slider design 400 according to the present invention. The slider design includes a front pad 402 disposed on a first shallow step region 404 and a rear pad 406 surrounded by a second shallow step region 408 of the same depth as the first, i.e., approximately 0.11 microns. The shallow step region 404 of the front pad 402 also has two side rails 410, 412 extending toward the rear pad 406 along both side edges 414, 416 of the slider. These side rails 410, 412 are required to form the negative pressure pocket 420. Negative pressure pocket 420 is a deeper step region than shallow step regions 404, 408.

Figure 5:
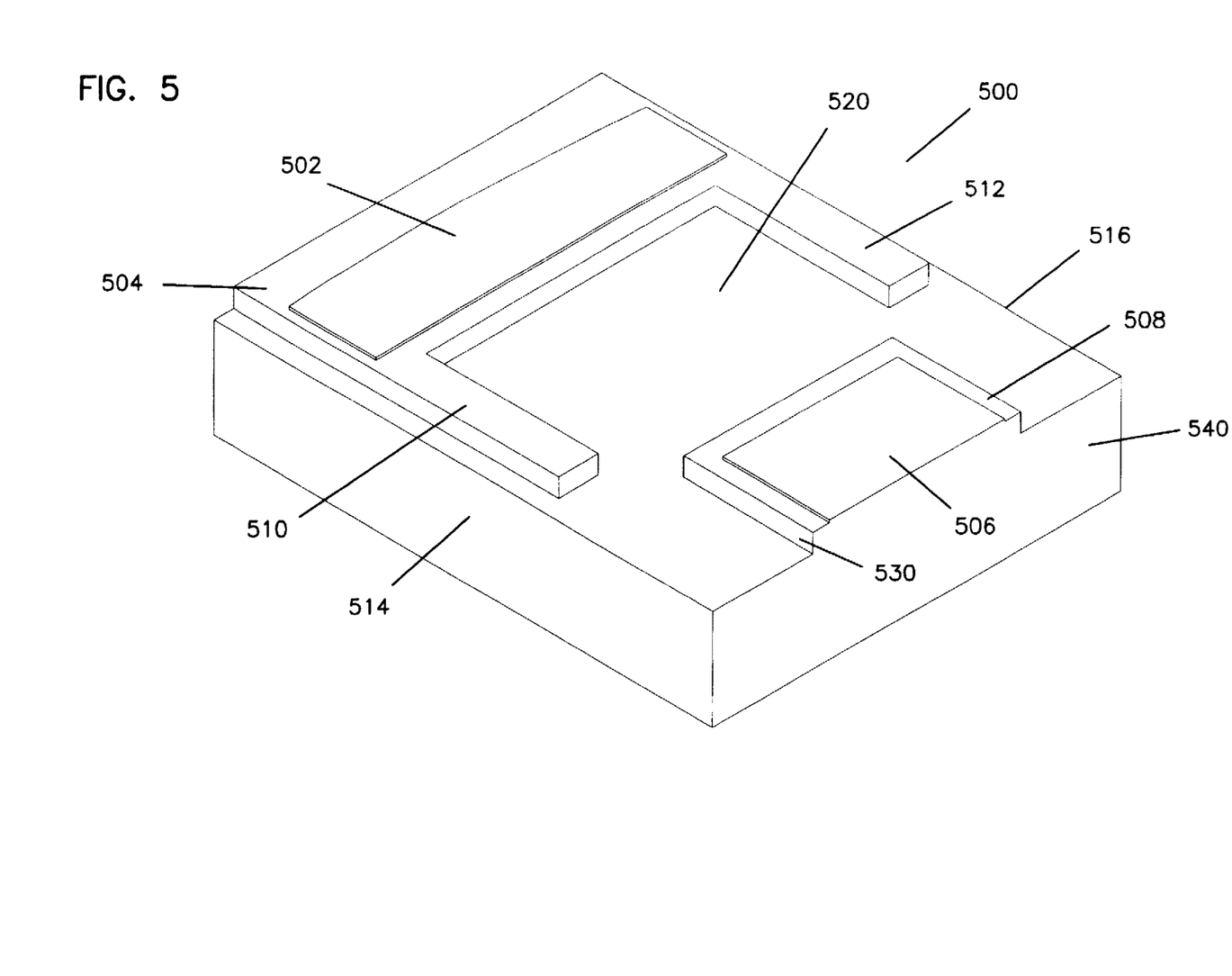
FIG. 5 is a perspective view of the slider illustrated in FIG. 4.

FIG. 5 is a perspective view 500 of the slider illustrated in FIG. 4. The front 502 and rear 506 pads are surrounded by shallow step regions 504 and 508, respectively. Shallow step region 504 also has two side rails 510, 512 toward the rear pad 506 along both side edges 514, 516 of the slider. Shallow step regions 504, 508 and side rails 510, 512 are separated by a deeper etch step 530. The depth of etch step 530 is shallower than the deep cavity illustrated in FIG. 3 (i.e., element 328 in FIG. 3), but it is deeper than the shallow step regions 504, 508 surrounding the front 502 and rear 506 pads. To minimize altitude sensitivity, the depth of the etch step 530 is optimized, e.g. preferably between 0.5 microns and 5.0 microns depending on the file environment and slider size. Once the optimum depth for etch step 530 is determined, the fly height profile is optimized by adjusting the depth of shallow step regions 504, 508, 510, and 512, adjusting the lengths of side rails 510 and 512, and the size of front pad 502 and rear pad 506. The depth of shallow step regions 504, 508 is shallower than etch step 530 and is adjusted to control the amount of positive pressure lift on pads 502 and 506 and hence the fly height of the slider 500. The length of side rails 510, 512 control the amount of negative pressure and the relative inner diameter to outer diameter fly height profile. The slider design 500 illustrated in FIG. 5 is optimized for a flat inner diameter to outer diameter fly height profile. Those skilled in the art will recognize that the side rails 510, 512 may be extended completely to the trailing edge 540 of the slider to increase the negative pressure generated by negative pressure pocket 520 if a different fly height profile is desired. Those skilled in the art will also recognize that the size of the front 502 and rear 506 pads can be adjusted to achieve the desired fly height profile.

Figure 6:
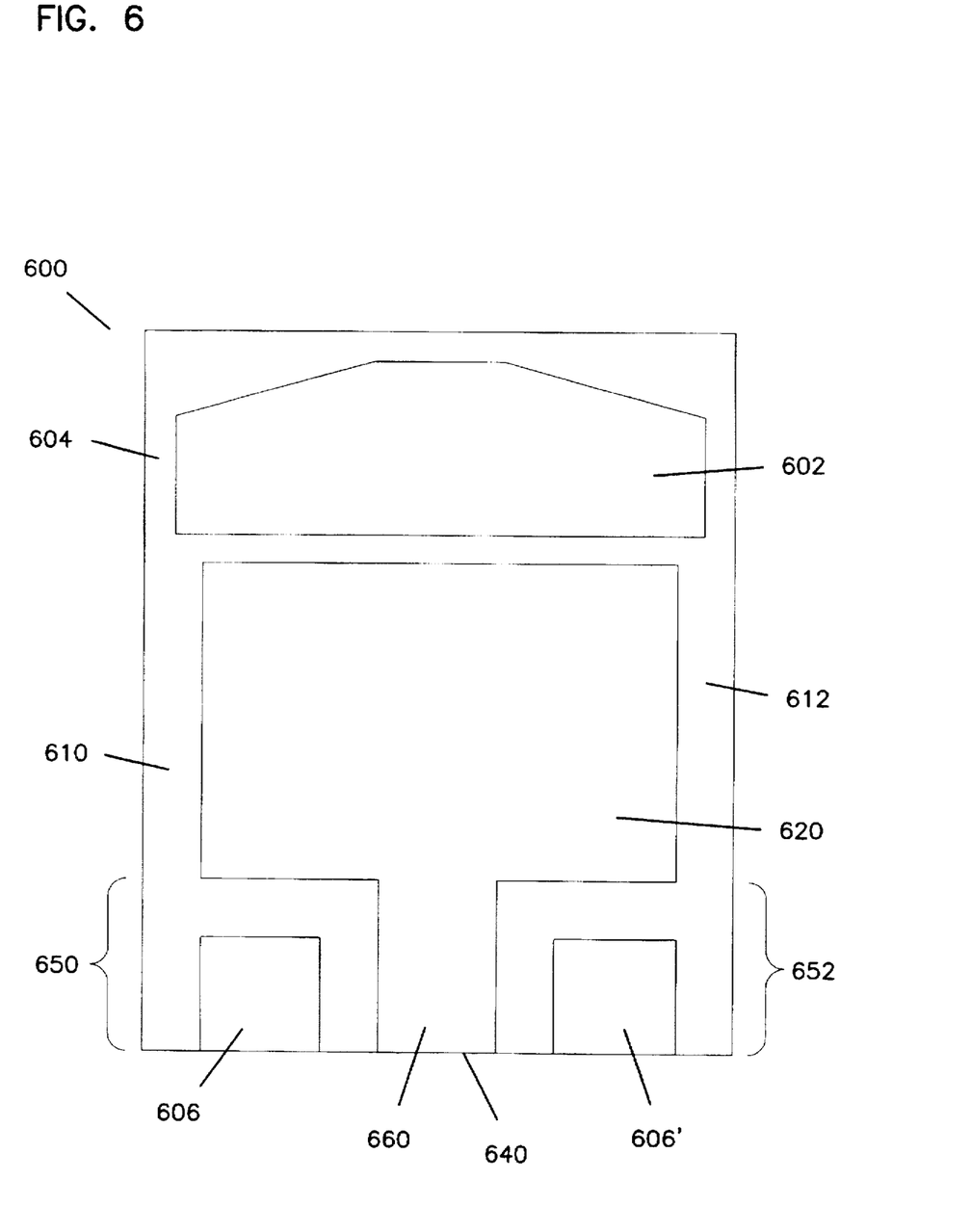
FIG. 6 illustrates another embodiment of the present invention wherein the side rails extend to the trailing edge to form two trailing edge step regions.

FIG. 6 illustrates another embodiment 600 of the present invention wherein the side rails 610, 612 extend to the trailing edge 640 of the slider and form two trailing edge step regions 650, 652 each having a trailing edge pad 606, 606' disposed thereon. A channel 660 extending from the negative pressure pocket 620 to the trailing edge 640 is formed between the two trailing edge step regions 650, 652 to vent the negative pressure build-up in the negative pressure pocket 620.

Figure 7:
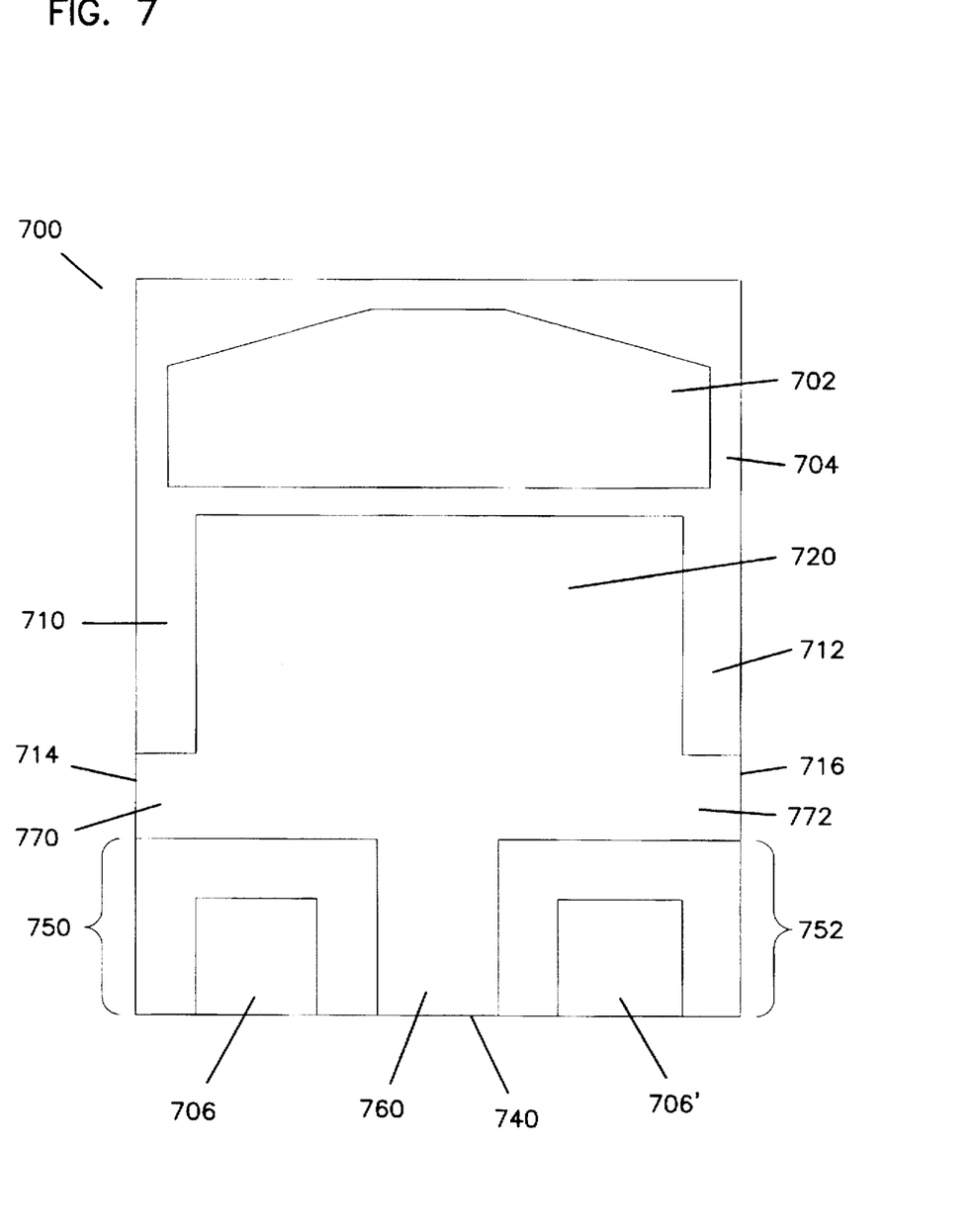
FIG. 7 illustrates another embodiment of the present invention having step regions at the trailing edge for supporting trailing edge pads.

FIG. 7 illustrates another embodiment 700 of the present invention wherein the step regions 750, 752 are provided at the trailing edge 740 of the slider, each supporting a trailing edge pad 706, 706'. As illustrated in FIG. 7, a channel 760 between the negative pressure pocket 720 and the trailing edge 740 is formed between the trailing edge step regions 750, 752. However, the side rails 710, 712 do not extend to the trailing edge 740 and do not merge with the trailing edge step regions 750, 752. Rather, side vents 770, 772 between the trailing edge step regions 750, 752 and the side rails 710, 712 are provided. Accordingly, the negative pressure pocket 720 is shorter, resulting in a smaller negative load.

Figure 8:
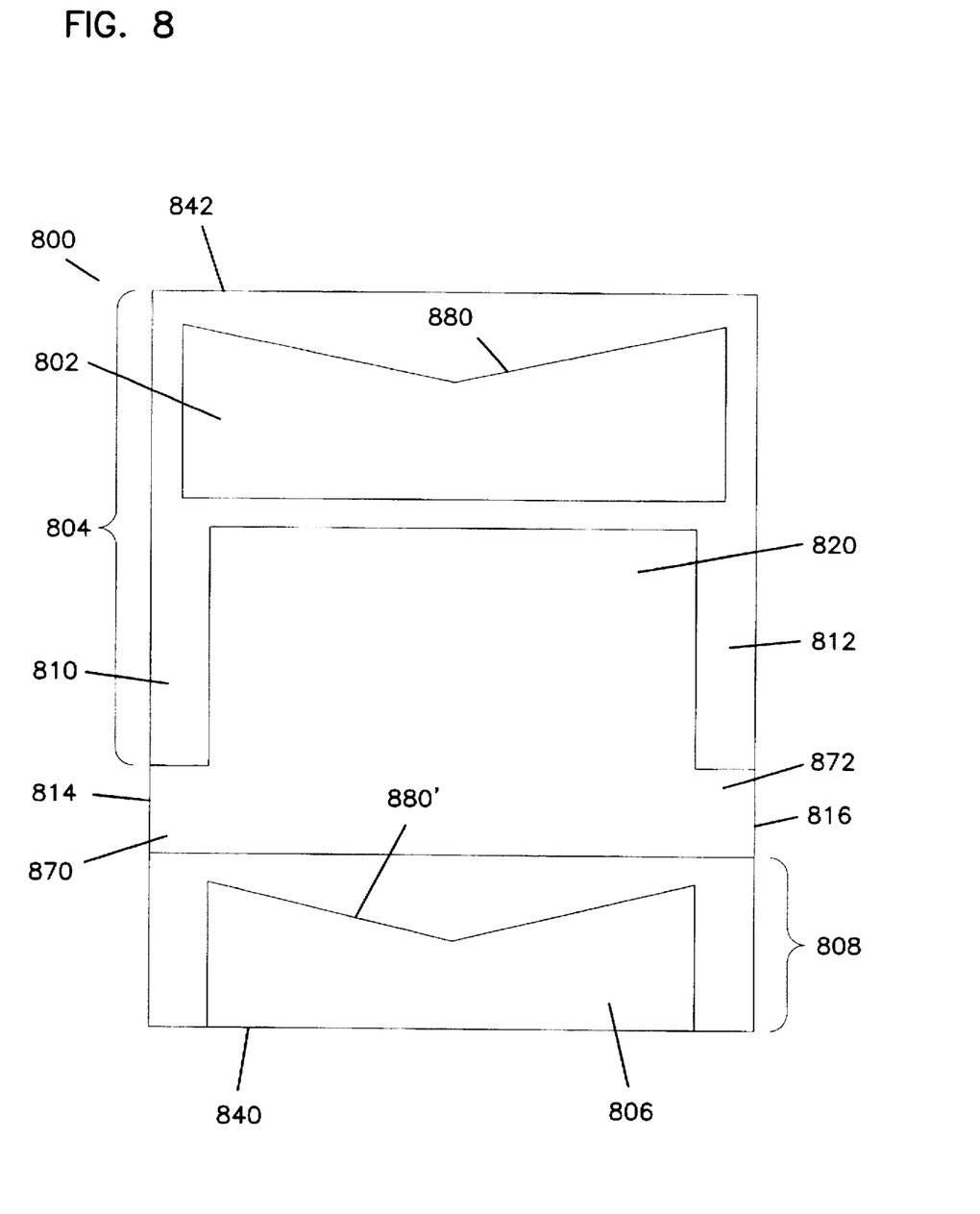
FIG. 8 illustrates another embodiment of the present invention having a full width step region at the trailing edge.

FIG. 8 illustrates another embodiment 800 of the present invention. In FIG. 8 side rails 810, 812 extend towards the trailing edge 840 to create a negative pressure pocket 820. A large, single step region 808 is provided at the trailing edge 840 extending from side 814 to side 816. A trailing edge pad 806 and a leading edge pad 802 are provided on the step regions 804, 808 at the trailing edge 840 and leading edge 842 respectively. The side rails 810, 812 do not extend to the trailing edge 840 and do not merge with the trailing edge step region 808. Rather, side vents 870, 872 between the trailing edge step region 808 and the side rails 810, 812 are provided. Accordingly, the negative pressure pocket 820 is shorter, resulting in a smaller negative load. Each of the pads 802, 806 include a leading edge 880, 880' which is concave to provide improved roll stiffness.

Figure 9:
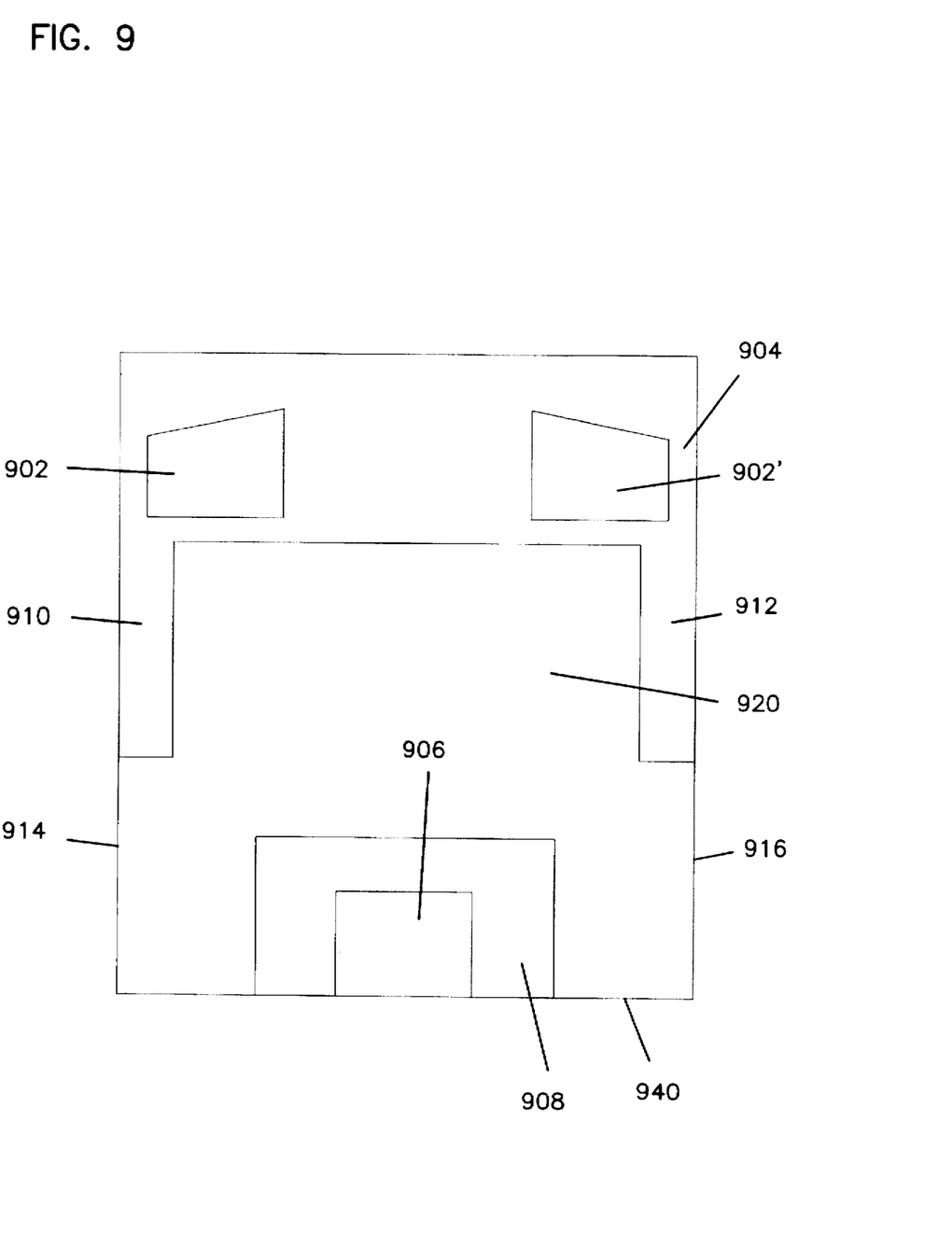
FIG. 9 shows another embodiment of the present invention having two front pads.

FIG. 9 shows another embodiment 900 of the present invention. The slider design 900 includes two front pads 902, 902' connected by a first shallow step region 904 and a single rear pad 906 surrounded by a second shallow step region 908. The first 904 and second 908 shallow step regions are formed by a first etch, preferably 0.11 microns, but depending on the file environment and slider size. The first shallow step region 904 of the front pad 902 also has two side rails 910, 912 extending toward the rear pad 906 along both side edges 914, 916 of the slider. These side rails 910, 912 form the negative pressure pocket 920. The negative pressure pocket 920 separates the shallow step regions 904, 908, and is formed by a second etch, which may be optimized anywhere between 0.5 mircrons and 5.0 microns to minimize altitude sensitivity depending on the file environment or slider size. Nevertheless, the order of performing the two etch processes that form the negative pressure pocket 920 and the first 904 and second 908 shallow step regions may be reversed. However, once the optimal depth for the negative pressure pocket 920 is determined, the depth of shallow step regions 904, 908 the lengths of the side rails 910, 912, and the size of pads 902, 906 are optimized to achieve the desired fly height profile.

Figure 10:
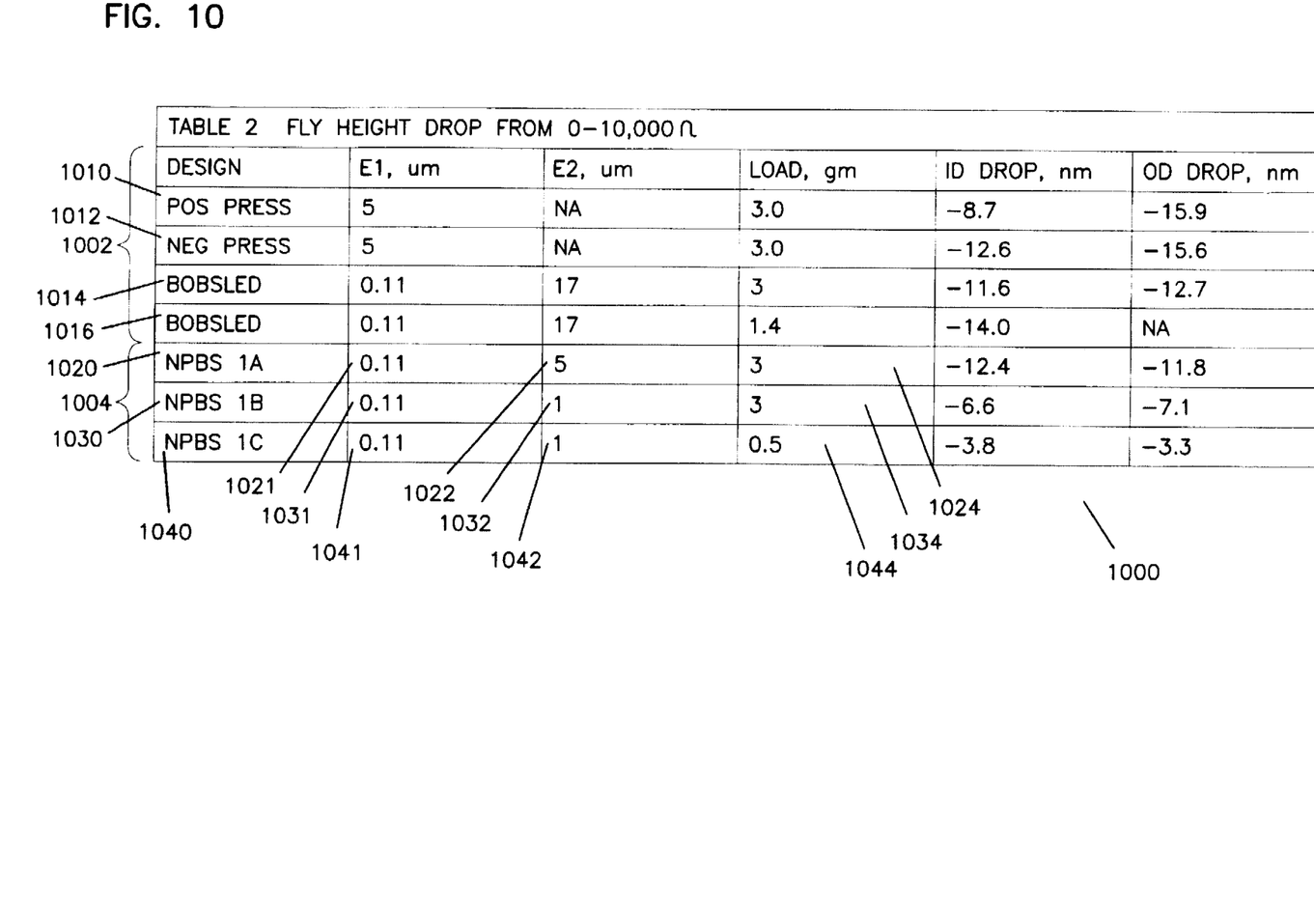
FIG. 10 illustrates a table comparing the fly height loss from 0–10,000 feet of various prior art designs and three slider designs according to the present invention.

FIG. 10 illustrates a table 1000 comparing the fly height loss from 0–10,000 feet of various prior art designs 1002 and three slider designs 1004 according to the present invention. The prior art designs 1002 consist of a positive 1010 and negative 1012 pressure single edge depth design and two bobsled designs, one at 3 grams 1014 and one at 1.4 grams 1016. A first slider design 1020 according to the present invention has a shallow etch depth of 0.11 microns 1021, and deep etch depth of 5 microns 1022 and a load of 3 grams 1024. The second slider design 1030 according to the present invention has a shallow etch depth of 0.11 microns 1031, a deep etch depth of one micron 1032, and a load of 3 grams 1034. Finally, the third slider design 1040 according to the present invention includes a shallow etch depth of 0.11 microns a deep etch depth of 1 micron 1042, and a load of 0.5 grams 1044. The comparison in the first 1020 and second 1030 slider designs according to the present invention illustrates a 43 percent average inner diameter to outer diameter reduction in altitude sensitivity by reducing the etch depth from 5 1022 to 1 1032 micron, since

−12.4—6.6=−5.8,

−11.8−7.1=−4.7,

−5.8÷−12.4=46%,

−4.7÷−11.8=39.8%, and (46%+39.8%)÷2=43%.

Similarly, a comparison of the second 1030 and third 1040 slider designs according to the present invention illustrates an average inner diameter to outer diameter reduction of 48 percent by reducing the gram load from 3 1034 to 0.5 1044 grams. Now, comparing the third slider 1040 design to the 3 gram bobsled design 1014 shows a 71 percent reduction and comparing the negative pressure design 1012 to the third slider design 1040 according to the present invention illustrates a reduction of 74 percent.

In summary, an air bearing slider design which exhibits reduced altitude sensitivity has been disclosed. The slider design provides reduced altitude sensitivity but requires only two etch depths for ease of manufacturability. However, those skilled in the art will recognize that the number and arrangement of the pads and the step regions are not limited to those disclosed above, but may be selected according to the teaching of the present invention in consonance with the conditions exhibited by the storage device to yield less sensitivity to changes in altitudes.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider with reduced altitude sensitivity having a first side, a second side and a leading and trailing edge, comprising:
   a leading step surface, formed at a first etch depth, the leading step surface having two side rails joined together adjacent to the leading edge and extending toward the trailing edge, forming a negative pressure pocket there between;
   a trailing step surface, formed at the first etch depth;
   a front pad, formed on the leading step surface at a second etch depth, the first etch depth being greater than the second etch depth; and
   a trailing pad, formed on the trailing step surface at the second etch depth.

2. The slider of claim 1 wherein the front pad comprises two front pads, each pad being proximate to the sides of the slider.

3. The slider of claim 1 wherein the trailing pad is disposed generally in the center of the trailing step surface at the trailing edge.

4. The slider of claim 1 wherein the trailing step surface is disposed generally equidistant from the sides of the slider.

5. The slider of claim 1 wherein the front pad comprises an angled leading edge.

6. The slider of claim 1 wherein the side rails have a length selected for creating a desired negative pressure.

7. The slider of claim 1 wherein the first etch depth is between 0.5 mm and 5 mm.

8. The slider of claim 1 wherein the second etch depth is less than half of the first etch depth.

9. The slider of claim 1 wherein the side rails extend substantially to trailing edge.

10. The slider of claim 1 wherein the front pad extends substantially from the first side of the slider to the second side of the slider.

11. The slider of claim 1 wherein the trailing step surface further comprises first and second training step surfaces adjacent the trailing edge, one disposed on each side of the slider and forming a channel therebetween, and wherein the trailing pad further comprises first and second trailing pads, one on each of the trailing step surfaces, the negative pressure pocket being disposed between the side rails.

12. The slider of claim 11 wherein the front pad extends substantially from the first side of the slider to the second side of the slider.

13. The slider of claim 11 wherein the side rails connect to the two trailing step surfaces.

14. The slider of claim 11 wherein the side rails terminate forward of the two trailing step surfaces, forming two side vents.

15. The slider of claim 1 wherein the trailing step surface extends the width of the slider.

16. The slider of claim 1 wherein the leading pad and trailing pad each further comprise a generally v-shaped notch disposed at a leading edge thereof.

17. A data storage device, comprising:
   a storage medium including a plurality of tracks;
   a slider for supporting a transducer over the plurality of tracks, the slider having a first side, a second side, and a leading and trailing edge, the slider further comprising:
      a leading step surface, formed at a first etch depth, the leading step surface having two side rails joined together adjacent to the leading edge and extending toward the trailing edge, forming a negative pressure pocket there between;
      a trailing step surface, formed at the first etch depth;
      a front pad, formed on the leading step surface at a second etch depth, the first etch depth being greater than the second etch depth; and
      a trailing pad, formed on the trailing step surface at the second etch depth;
   a motor, coupled to the storage medium, for moving the storage medium relative to the slider; and
   an actuator assembly connected to the slider body for moving the slider body generally transversely relative to the direction of a track on the storage medium so the transducer may access different regions on the storage medium.

18. The data storage device of claim 17 wherein the front pad comprises two front pads, each pad being proximate to the sides of the slider.

19. The data storage device of claim 17 wherein the trailing pad is disposed generally in the center of the trailing step surface at the trailing edge.

20. The data storage device of claim 17 wherein the trailing step surface is disposed generally equidistant from the sides of the slider.

21. The data storage device of claim 17 wherein the front pad comprises an angled leading edge.

22. The data storage device of claim 17 wherein the side rails have a length selected for creating a desired negative pressure.

23. The data storage device of claim 17 wherein the first etch depth is between 0.5 mm and 5 mm.

24. The data storage device of claim 17 wherein the second etch depth is less than half of the first etch depth.

25. The data storage device of claim 17 wherein the side rails extend substantially to trailing edge.

26. The data storage device of claim 17 wherein the front pad extends substantially from the first side of the slider to the second side of the slider.

27. The data storage device of claim 17 wherein the trailing step surface further comprises first and second trailing step surfaces adjacent the trailing edge, one disposed on each side of the slider and forming a channel therebetween, and wherein the trailing pad further comprises first and second trailing pads, one on each of the trailing step surfaces, the negative pressure pocket being disposed between the side rails.

28. The data storage device of claim 27 wherein the front pad extends substantially from the first side of the slider to the second side of the slider.

29. The data storage device of claim 27 wherein the side rails connect to the two trailing step surfaces.

30. The data storage device of claim 27 wherein the side rails terminate forward of the two trailing step surfaces, forming two side vents.

31. The data storage device of claim 17 wherein the trailing step surface extends the width of the slider.

32. The data storage device of claim 17 wherein the leading pad and trailing pad each further comprise a generally v-shaped notch disposed at a leading edge thereof.

* * * * *